Feb. 20, 1940.  W. F. OCENASEK  2,191,410
JIGSAW BLADE SUPPORT AND WORK HOLD-DOWN
Original Filed July 17, 1936   2 Sheets-Sheet 1
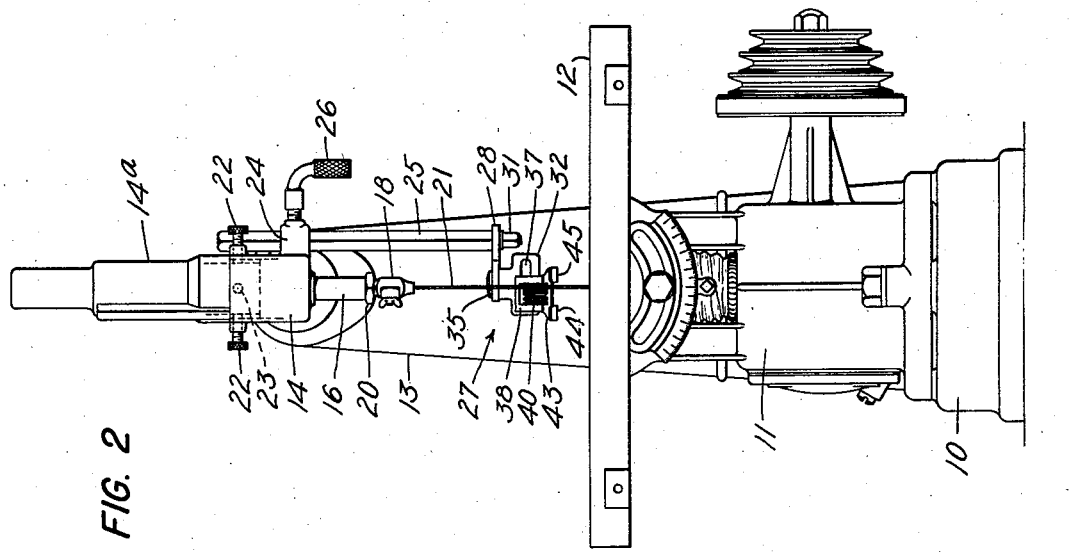
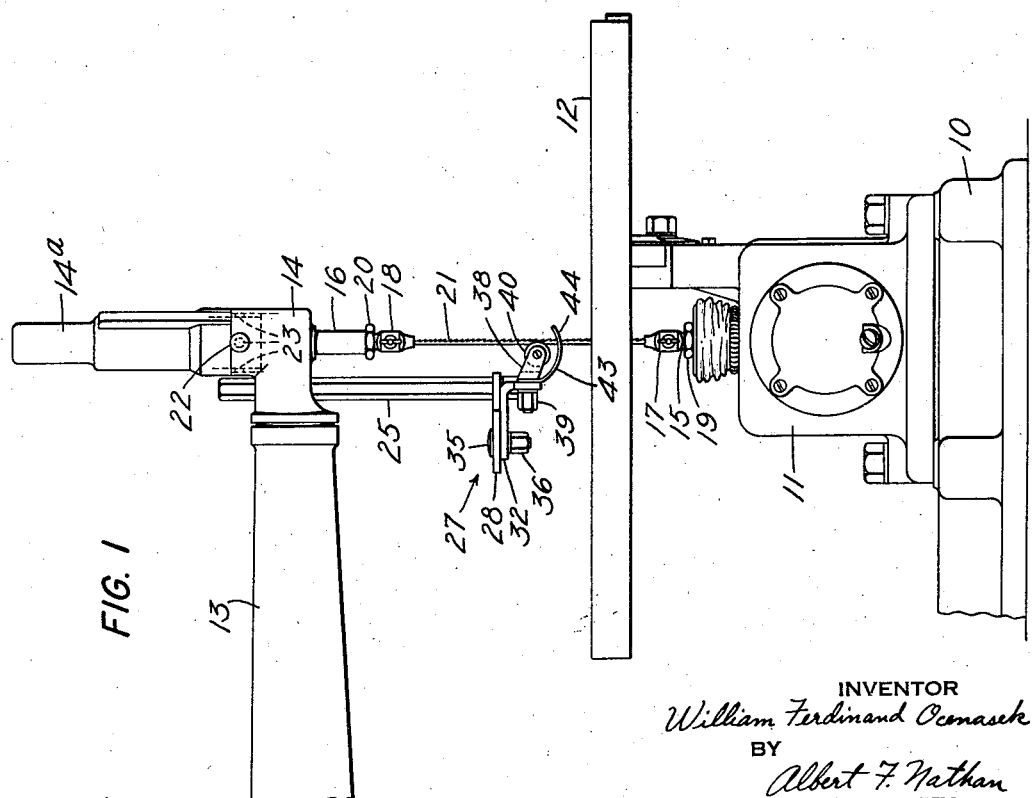
INVENTOR
William Ferdinand Ocenasek
BY
Albert F. Nathan
ATTORNEY Feb. 20, 1940. W. F. OCENASEK 2,191,410
JIGSAW BLADE SUPPORT AND WORK HOLD-DOWN
Original Filed July 17, 1936 2 Sheets-Sheet 2
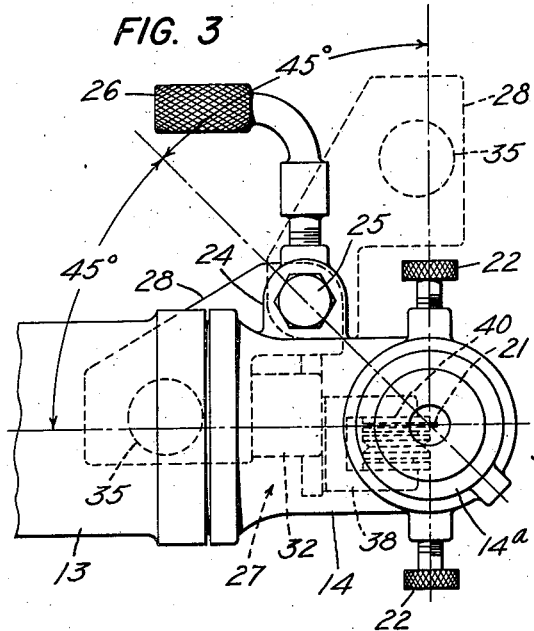
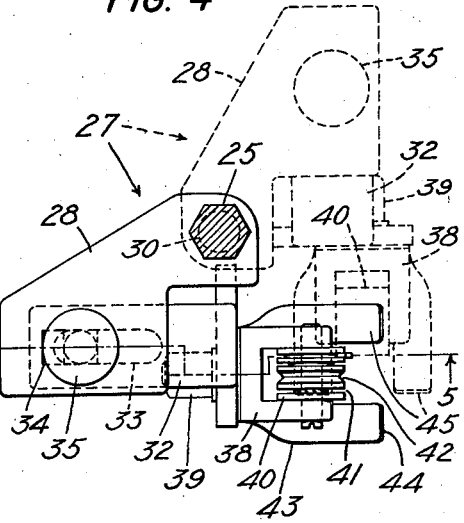
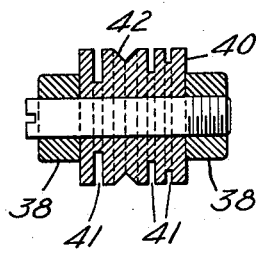
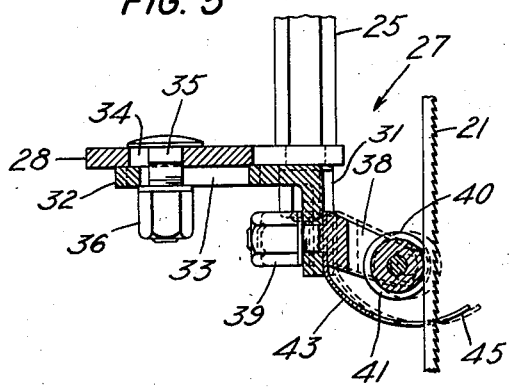
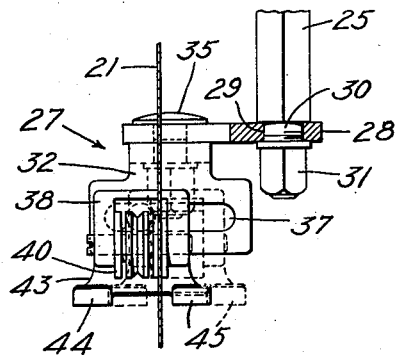
INVENTOR
William Ferdinand Ocenasek
BY
Albert F. Nathan
ATTORNEY Patented Feb. 20, 1940

2,191,410

UNITED STATES PATENT OFFICE 2,191,410

JIGSAW BLADE SUPPORT AND WORK HOLD-DOWN

William Ferdinand Ocenasek, Plainfield, N. J., assignor to Walker-Turner Company, Inc., Plainfield, N. J., a corporation of New York Original application July 17, 1936, Serial No. 91,124. Divided and this application August 11, 1937, Serial No. 158,525

3 Claims. (Cl. 143—162)

The present invention relates to improvements in jigsaws and particularly to an improved method and means for guiding and supporting saw blades of different widths and thicknesses and in the different angular positions that a blade is ordinarily adjusted during the operation of a machine of this character.

My prior application, Serial No. 91,124, filed July 17, 1936, Patent No. 2,116,123, with respect to which this application is a division, discloses a jigsaw machine embodying the present invention which, for a primary aim undertakes to increase the length of blade life by properly supporting and guiding the blade in the region where the breaking thrusts generally occur.

A further aim of the invention is to facilitate the manual operation of guiding and supporting the workpiece and to render observation of the finished portions of the cut less difficult as the sawing operation progresses whereby the sawing time of any given piece may be materially increased and with less danger of saw breakage.

Still another objective of the invention is to render available a combined saw guide and work-holding structure for jigsaw machines which by a few simple adjustments may be quickly adapted to various thicknesses of workpieces and accommodated to different thicknesses and widths of saw blades.

A further object of the invention is to construct a saw guide and work-holding means for a jigsaw of parts simply and easily machinable and which are capable of being assembled relative to their supporting structure and to the saw blade in either a right or a left hand position depending upon the plane of the adjustment given to the saw blade.

In furthering the aims of the invention, it is proposed to suspend from the upper head structure of the jigsaw, a combined guide and hold-down mechanism at the end of a non-rotatable rod member, which member is adjustable longitudinally in a direction parallel to the line of reciprocation of the saw. As the lower end of the adjustable support, a laterally extending L-shaped plate member is mounted which in turn, carries a relatively adjustable supplemental bracket member that normally is disposed to the rear of the saw blade. The supplemental bracket is arranged to carry a work engaging presser foot element and also a laterally adjustable multi-grooved guide roller. The grooves on the roller are preferably of different width and depth and each is adapted to receive a substantial portion of the saw blade whereby the frictionless back support is given to the blade as well as lateral guiding surfaces that prevent the blade from twisting and getting out of line.

The adjustable supporting post is so located with respect to the normal plane of the saw that it does not obstruct the operator's view of the completed saw irrespective of whether the plane of the saw is in the normal vertical plane of the machine or whether it is positioned 90° from normal. And so that the same mechanism may be used for either extreme of saw positions the laterally extending L-shaped plate member is so constructed that it may be removed from its support, inverted, and positioned 90° from normal thereby to support the guide roller and presser foot mechanism behind the saw when the latter has been turned to the 90° position.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a side view of a portion of a jigsaw machine embodying the invention.

Fig. 2 is a front elevation thereof.

Fig. 3 is a plan view of the guide mounting in relation to the upper head mechanism.

Fig. 4 is a plan view of the combined guide and work hold-down.

Fig. 5 is a vertical section taken along lines 5—5 of Fig. 4.

Fig. 6 is a front view of the guide roller and presser foot mechanism.

Fig. 7 is a sectional view of the multi-grooved guide roller.

Referring more particularly to Figs. 1 and 2, the jigsaw illustrated comprises essentially a base member 10, a tool reciprocating mechanism 11, and a table 12. The base 10 extends rearwardly and upwardly and has mounted thereon an arm member 13 that extends forwardly into overlying relationship with the table 12. At its forward end is mounted an upper saw reciprocating mechanism 14.

As explained more fully in my aforementioned application, the saw reciprocating mechanisms include a lower power driven plunger 15 and an upper spring retracted plunger 16 to which are fitted saw receiving chucks 17 and 18 respectively. By loosening the check nuts 19 and 20, the saw receiving chucks may be turned to any angular position to turn the plane of the saw 21 correspondingly. Normally however, the plane of the saw 21 will lie in the vertical longitudinal plane of the machine as illustrated in Figs. 1 and 2.

To facilitate angular adjustment of the plane of the saw to definite frequently used positions, the casing 14ª of the upper head member is adapted to be released by backing out the screws 22 and then turned as a unit to the required angular position. Holes 23 formed in a telescoped portion of the casing 14ª, in cooperation with the screws definitely locate the upper saw plunger in commonly used angular positions. When the casing 14ª is turned, the upper plunger 16 and chuck 18 is likewise turned, and by this means the plane of the saw may be turned to a predetermined position. Thereafter the lower chuck 17 is adjusted in coincidence with the upper chuck.

The upper head bracket 14 is provided with a laterally projected lug 24 through which a supporting bar 25 is vertically adjustable. The bar 25 is preferably squared, hexagonal, or otherwise splined to the bracket 14 so that it does not turn on its axis. A hand operated clamp 26 is provided for holding the bar 25 in vertically adjusted positions.

The bar 25 supports at its lower end a combined saw guard and work hold-down mechanism, indicated generally as 27, in cooperative relation with the saw and workpiece. Figs. 3 to 7 inclusive illustrate the mechanism 27 in greater detail and which includes an L shaped plate member 28 which is bored at 29 to fit a studded end 30 of the support 25. A clamp nut 31 is provided for clamping the plate 28 to the bar 25. The laterally projecting portion of the plate 28, in turn, supports a depending bracket 32 which is adjustable in a horizontal plane toward or away from the axis of the saw. This adjustment is accomplished by providing an elongated slot 33 in the depending bracket and a shorter square ended slot 34 in the L shaped plate. A square shouldered bolt 35 passes through the said slots and holds the parts together. By releasing the clamping nut 36, threaded to the bolt 35, the bracket member 32 may be adjusted laterally the combined lengths of the slots 33 and 34 or adjusted angularly about the axis of the clamp screw 35 as may be desired.

The forward end of the bracket 32 depends downwardly and is provided with a slot 37, the axis of which is transverse the axis of the slot 33. A forked roller-guide supporting bracket 38 passes through the lateral slot 37 and is adapted to be clamped thereto in laterally adjusted positions by means of the clamp nut 39. The two legs of the bracket 38 extend forwardly toward the saw blade and have mounted therebetween a multi-grooved guide roller 40. The roller 40 is provided with a series of annular grooves 41 of various depths and widths and preferably with at least one V shaped groove 42. The grooves 41 are proportioned to fit the most commonly used sizes of saw blades, while the V shaped groove 42 is provided to fit the extremely fine saw blades.

Associated with the bracket member 32 is a resilient presser foot member 43, bifurcated at its forward end to provide two resilient tines 44 and 45 disposed at each side of the saw. The function of the presser foot mechanism is to exert a downwardly acting force upon the workpiece, holding the piece against the work table 12 upon each up stroke of the saw, yet allowing the work to be moved thereunder as it is fed along the line of cut. As illustrated in the drawings the axis of the guide roller 40 lies relatively close to the presser foot mechanism 43 and gives a back support to the saw blade close to the upper surface of the workpiece.

To adjust the roller 40 to a saw of a different width and thickness, the clamp nuts 31, 36 and 39 are released so that all parts are free. The adjustment is rather delicate and the saw must not be cramped or under any lateral stresses when the parts are subsequently clamped in position. For that reason all parts are freed as above explained and the proper groove of the guide roller adjusted into position in alignment with blade and brought lightly into contact therewith. With the plane of the groove in coincidence with the plane of the blade the clamp nut 39 is tightened. Thereafter the clamp nut 36 is tightened, and finally the clamp nut 31 on the supporting shaft. The mechanism as a unit may thereafter be adjusted vertically toward or away from the work to suit the thickness thereof and to obtain the desired pressure thereon.

In this connection it will be noted, that the presser foot exerts a pressure on the workpiece at each side of the saw and prevents the workpiece from lifting on the up stroke of the saw. The space between the projecting tines of the presser foot is such as to permit the guide roller and presser foot element to be shifted as a unit laterally its full axial distance thereby to bring any groove therein into supporting and guiding relation with the saw blade.

With reference to Figs. 3 and 5 it will be observed that the axis of the supporting rod 25 is disposed 45° from the medial plane of the machine and is thereby offset laterally from the normal plane of the saw. This relationship of the parts affords the operator a substantially unrestricted view of the saw cut as the sawing operation progresses.

Additionally, the location of the axis of the support on the 45° line, makes it possible to use the same guide and hold-down mechanism for rip-sawing and the like. For in such operations, the plane of the saw is turned 90° from normal and by inverting the L shaped plate member 28 and reassembling the parts in the dotted line position illustrated in Fig. 4, the same guide roller and presser foot mechanism may be used in the new position. When so located, the guide and supporting roller 40 is capable of universal adjustment as before explained, and the vertical supporting bar 25 again laterally offset from the plane of the saw and not obstructing the vision.

Intermediate angular adjustments of the plane of the saw blade may conveniently be obtained as set forth above and the saw guide roller and work hold-down adjusted in proper relation. In such cases, the pivotal connections at 30 and 35, and the slots 33, 34 and 37, provide an extensible and retractile medium for compensating for variations in the distance between the support 25 and the saw blade, as the plane of the latter is turned. With this type of linkage, it is possible to maintain the axis of the roller guide perpendicular to the plane of the saw and in supporting and guiding relation therewith in its angularly adjusted positions.

A further advantage of the laterally offset support is that rod 25 does not pass through the axis of the overarm or interfere with the mounting of the jigsaw head thereon. The plate members 28 and 32 mounted to the lower end of the rod may be of simple form, constructed from flat stock relatively inexpensively. When assembled and clamped together the members afford a full and complete range of adjustment and at the same time an exceptionally sturdy saw guide and work hold-down. For such operations wherein the roller guide and hold-down cannot be used, as in filing, the unit as a whole may be swung about the axis of the stud 30 well out of the operator's way.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A roller guide and back support for the blade of a jigsaw machine combining a supporting member laterally offset from the axis and from the normal plane of the saw blade; a laterally extending plate member pivotally mounted to said support; a guide roller supporting bracket pivoted to the laterally extending portion of said plate member; a roller member journaled in said bracket said roller having a plurality of spaced annular grooves therein; means for adjusting said roller axially of its support to position the plane of one of the grooves of the roller in the plane of the saw; and means for adjusting said roller toward the axis of the saw to bring said groove into supporting and guiding relation therewith.

2. An extensible saw guide and support for an angularly adjustable saw blade of a jigsaw machine combining a vertically adjustable supporting member laterally offset from the normal plane of the saw blade; a laterally extending plate member pivoted to the end of said supporting member; a bracket pivoted to said plate and adjustable angularly thereon and toward or away from the axis of the saw; a guide roller journaled to said bracket on an axis perpendicular to the axis of the saw; said roller having an annular groove therein adapted to receive the back portions of the saw blade and to support the blade against rearward and laterally acting forces; means for positioning said roller in supporting and guiding relation with the back of the saw blade when the plane of the latter is adjusted angularly out of its normal median plane; and means adjustable angularly and vertically as a unit with said guide roller for resiliently exerting a pressure at opposite sides of the line of cut of the saw on a workpiece of a predetermined thickness.

3. A universally adjustable roller guide and support for an angularly adjustable saw blade of a jigsaw machine combining a supporting member laterally offset from a median plane of the machine; a laterally extending plate member removably pivoted to the end of said supporting member; a bracket pivoted to said plate and adjustable angularly thereon and toward or away from the axis of the saw; a guide roller journaled to said bracket on an axis perpendicular to the axis of the saw; said roller having an annular groove therein adapted to receive the back portions of the saw blade and to support the blade against rearward and laterally acting forces; means for positioning said roller in supporting and guiding relation with the back of the saw when the plane of the latter is in the normal median plane of the machine; and means for positioning said roller in supporting and guiding relation with the back of the saw where the plane of the latter is adjusted angularly about its axis to a position approximately 90° away from its normal plane.

WILLIAM FERDINAND OCENASEK.